US006042255A

United States Patent [19]

Kibayashi

[11] Patent Number: 6,042,255

[45] Date of Patent: Mar. 28, 2000

[54] VEHICULAR LAMP FOR VEHICLE

[75] Inventor: Michinobu Kibayashi, Shizuoka, Japan

[73] Assignee: Koito Manufacturing Co., Ltd., Tokyo, Japan

[21] Appl. No.: 09/090,841

[22] Filed: Jun. 4, 1998

[30] Foreign Application Priority Data

Jun. 6, 1997 [JP] Japan .................................... 9-149628

[51] Int. Cl.[7] ........................................................ B60Q 1/04

[52] U.S. Cl. .......................... 362/547; 362/546; 362/373; 362/294; 362/96

[58] Field of Search .................................... 362/546, 547, 362/541, 373, 96, 294

[56] References Cited

U.S. PATENT DOCUMENTS

| | | | |
|---|---|---|---|
| 5,010,453 | 4/1991 | Ketterman | 362/547 |
| 5,041,949 | 8/1991 | Hirota et al. | 362/547 |
| 5,367,438 | 11/1994 | Deslanders | 362/61 |
| 5,406,467 | 4/1995 | Hashemi | 362/294 |
| 5,497,308 | 3/1996 | Ohtsuka et al. | 362/547 |
| 5,562,337 | 10/1996 | Takinami et al. | 362/294 |
| 5,743,630 | 4/1998 | Yanagihara et al. | 362/547 |
| 5,833,336 | 10/1998 | Yamamoto et al. | 362/294 |
| 5,842,776 | 12/1998 | SShigemura et al. | 362/294 |

FOREIGN PATENT DOCUMENTS

| | | | |
|---|---|---|---|
| 2619-343 | 2/1989 | France | 362/547 |

*Primary Examiner*—Sandra O'Shea
*Assistant Examiner*—John A. Ward
*Attorney, Agent, or Firm*—Morgan, Lewis & Bockius LLP

[57] ABSTRACT

In a vehicular lamp wherein an air hole for effecting a breathing operation is formed in a lamp body, and a tubular member of an oval transverse cross-section, having a reduced right-left width, is formed on and extends from the lamp body in generally surrounding relation to the air hole. A partition wall is formed within the tubular member, and a slit is formed in a lower portion of a peripheral wall of the tubular member, and a cap of an oval transverse cross-section, having a reduced right-left width, is fitted on a distal end portion of the tubular member in such a manner that part of the slit is not covered with the cap. A labyrinth-like air passage is formed within the tubular member, and the air passage communicates with the interior of the lamp body through the air hole, and also communicates with the exterior of the tubular member through the slit. Since the air passage has a labyrinth-like construction, water will not intrude into the lamp body, and since the tubular member, as well as the cap, has the oval transverse cross-section having a reduced right-left width, the tubular member is less liable to interfere with other members, and the position of formation of the air hole is less limited.

18 Claims, 7 Drawing Sheets

VEHICULAR LAMP FOR VEHICLE

BACKGROUND OF THE INVENTION

1. Field of the Invention

The present invention relates to a vehicular lamp for an automobile in which an air hole for effecting a breathing operation is formed in a lamp body, and more particularly to a vehicular lamp for an automobile in which a tubular member, having a labyrinth-like air passage communicating with the air hole, is formed on the lamp body.

2. Related Art

FIGS. 9 and 10 show one example of a conventional vehicular lamp of this type in which a tubular member 3 is formed on and extends from a lamp body 1 in generally surrounding relation to an air hole 2 formed in the lamp body 1, and a cap 9 is fitted on the tubular member 3. With this construction, a labyrinth-like air passage, communicating with the air hole 2, is formed within the tubular member 3.

A generally horizontally-extending partition wall 4 is formed within the tubular member 3, and a slit 5 is formed in a lower portion of a peripheral wall of the tubular member 3, and extends from a distal end of the tubular member 3 toward a proximal end thereof. The cap 9 is fitted on the distal end portion of the tubular member 3 in such a manner that part of the slit 5 is not covered with the cap 9. A front edge 4*a* of the partition wall 4 is disposed rearwardly of the distal end of the tubular member 3, and an upper space 6 and a lower space 7 are formed within the tubular member 3, and the upper space 6 communicates with the interior of the lamp body 1 through the air hole 2, and the lower space 7 communicates with the upper space 6 through a gap between the cap 9 and the front 4*a* of the partition wall, and also communicates with the exterior of the tubular member 3 through the slit 5.

The air hole 2 in the lamp body 1 communicates with the exterior of the tubular member 3 through the air passage (that is, the upper space 6 and the lower space 7) formed within the tubular member 3, and the air hole 2 effects a breathing operation, but water will not intrude into the lamp body 1 through the air hole 2 since this air passage extends in a labyrinth-like manner.

In the above conventional technique, the air hole 2 is relatively large, and besides the tubular member 3, forming the air passage communicating with this air hole 2, is formed into a cylindrical shape having a relatively large outer diameter determined in accordance with the size of the air hole 2.

Therefore, the position of formation of the tubular member 3 must be considered so that the tubular member 3 will not interfere with projected portions (including a clamp portion for supporting a cord for supplying electric power to a bulb, and a bracket for being fixed to a vehicle body) on the rear side of the lamp body 1, and those members on the vehicle body which are provided around a lamp-receiving portion. Therefore, there has been encountered a problem that the position where the air hole 2 is formed is limited.

It has been confirmed through a study by the inventor of the present invention that if the size of the air hole 2 is small, this is effective in that water is less liable to intrude into the lamp body 1, and that the breathing operation by the air hole 2 is hardly influenced regardless of whether the size of the air hole 2 is large or small. Therefore, if the size of the air hole 2 is made small, and the tubular member 3, forming the air passage, is formed into a vertically-elongated, oval cross-section, so that the right-left width of the tubular member 3 is reduced, the tubular member 3 is less liable to interfere with other members, and based on these findings, the present invention has been made.

SUMMARY OF THE INVENTION

The present invention has been made in view of the above problems of the conventional technique, and an object of the invention is to provide a vehicular lamp for an automobile in which the position of formation of an air hole is less limited.

In order to achieve the above object, according to the present invention, there is provided a vehicular lamp wherein an air hole for effecting a breathing operation is formed in a lamp body, and the air hole is surrounded by a tubular member of an oval transverse cross-section whose right-left width is smaller than its top-bottom width, the tubular member being formed on and extending rearwardly from the lamp body; and a partition wall is formed within the tubular member, and a slit is formed in a lower portion of a peripheral wall of the tubular member, and extends in a direction of an axis of the tubular member, and a cap of an oval transverse cross-section whose right-left width is smaller than its top-bottom width is fitted on a distal end portion of the tubular member in such a manner that part of the slit is not covered with the cap, and a labyrinth-like air passage is formed within the tubular member, and the air passage communicates with the interior of the lamp body through the air hole, and also communicates with the exterior of the tubular member through the slit.

The interior of the lamp body communicates with the exterior of the tubular member through the air passage in the tubular member so that the breathing operation can be effected, and since this air passage in the tubular member is formed into a labyrinth-like construction, water will not intrude into the lamp body through this air passage.

The tubular member, as well as the cap fitted on this tubular member, has the oval transverse cross-section whose right-left width is smaller than its top-bottom width, and therefore the amount of bulging of the tubular member in the right-left direction is smaller than that in the top-bottom direction, and therefore the tubular member is less liable to interfere with other members.

In the vehicular lamp of the invention, the partition wall, formed within the tubular member, extends generally horizontally, and this generally horizontally-extending partition wall makes the labyrinth construction of the air passage, formed within the tubular member, more complicated.

In the vehicular lamp of the invention, a waterproof wall is formed on and extends from the lamp body, and the waterproof wall extends beneath the slit in the tubular member, and the waterproof wall, extending beneath the slit in the tubular member, prevents water, splashed along a rear surface of the lamp body, from intruding into the tubular member through the slit.

In the vehicular lamp of the invention, further, a pair of right and left ribs are formed on an upper surface of the waterproof wall, and a projection for engagement with the ribs is formed on the cap. The projection of the cap is engaged with the ribs of the waterproof wall, so that the cap is positioned relative to the tubular member in the peripheral direction, and also the rotation of the cap in the peripheral direction is prevented, and the cap is prevented from being disengaged from the tubular member.

In the vehicular lamp of the invention, moreover, a side wall of the cap is larger in thickness than a head portion of the cap. Since the thickness of the side wall of the cap is larger, the open end of the cap will not be much deformed when fitting the cap on the tubular member, and therefore the cap can be smoothly fitted on the tubular member.

In the vehicular lamp of the invention, anti-slip projections and recesses are formed at the head portion of the cap. The anti-slip projections and recesses prevent the slipping movement of the finger tip over the head portion of the cap, so that a pressing force, applied to the cap by the finger tip, directly serves as a force for fitting the cap on the tubular member.

DESCRIPTION OF THE PREFERRED EMBODIMENT

A preferred embodiment of the present invention will now be described.

Figure 1:
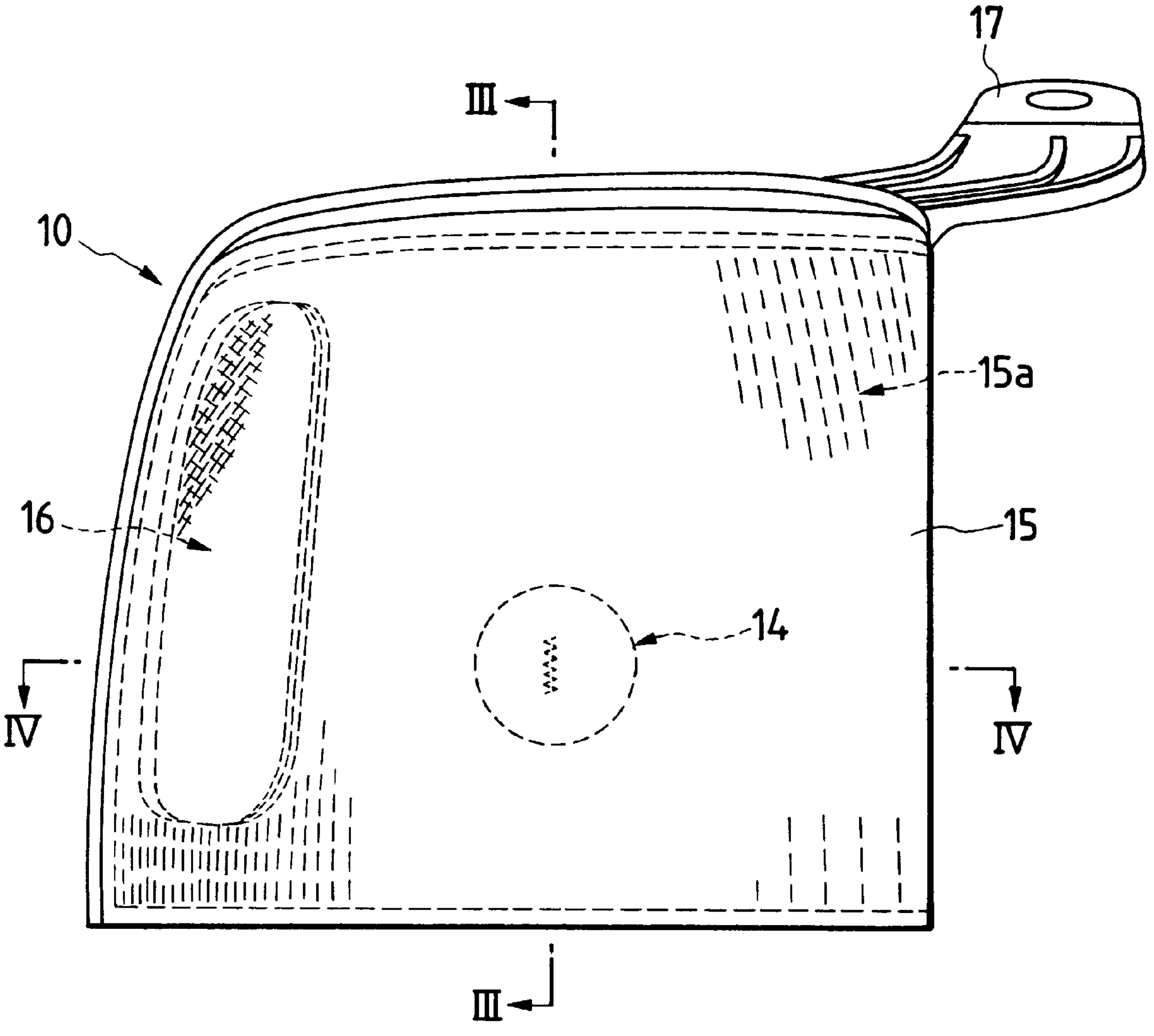
FIG. 1 is a front-elevational view of one preferred embodiment of a turn signal lamp of the present invention.
Figure 2:
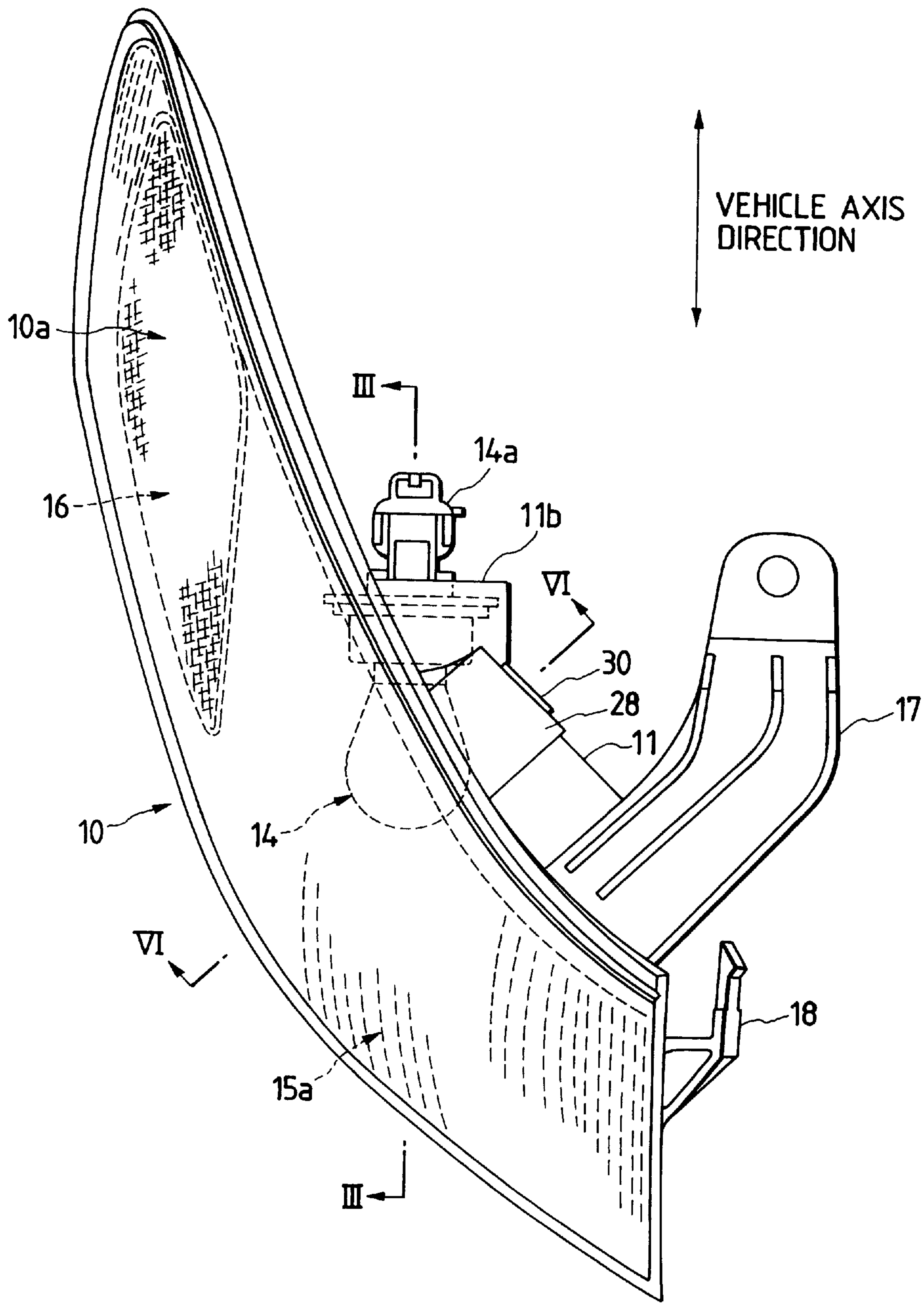
FIG. 2 is a plan view of the lamp.
Figure 3:
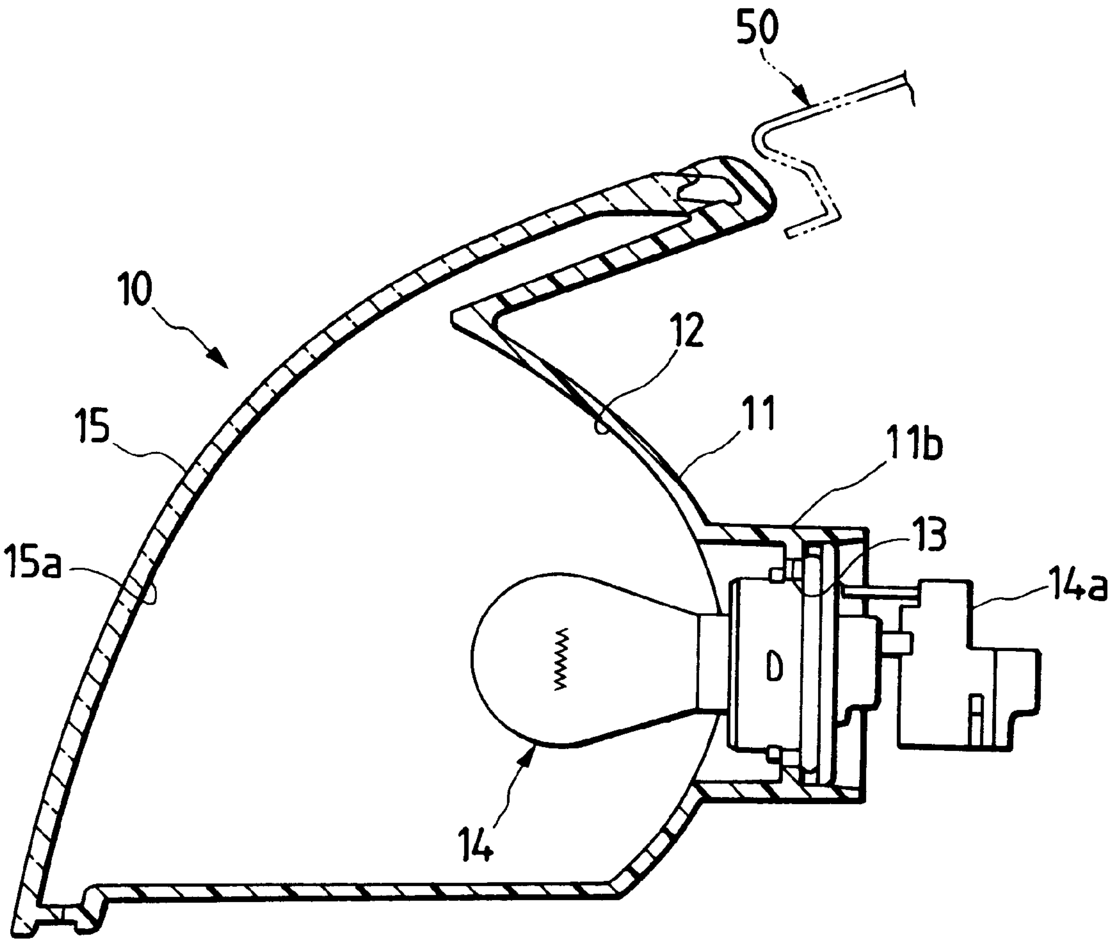
FIG. 3 is a vertical cross-sectional view of the lamp (taken along the line III—III of FIGS. 1 and 2)
Figure 4:
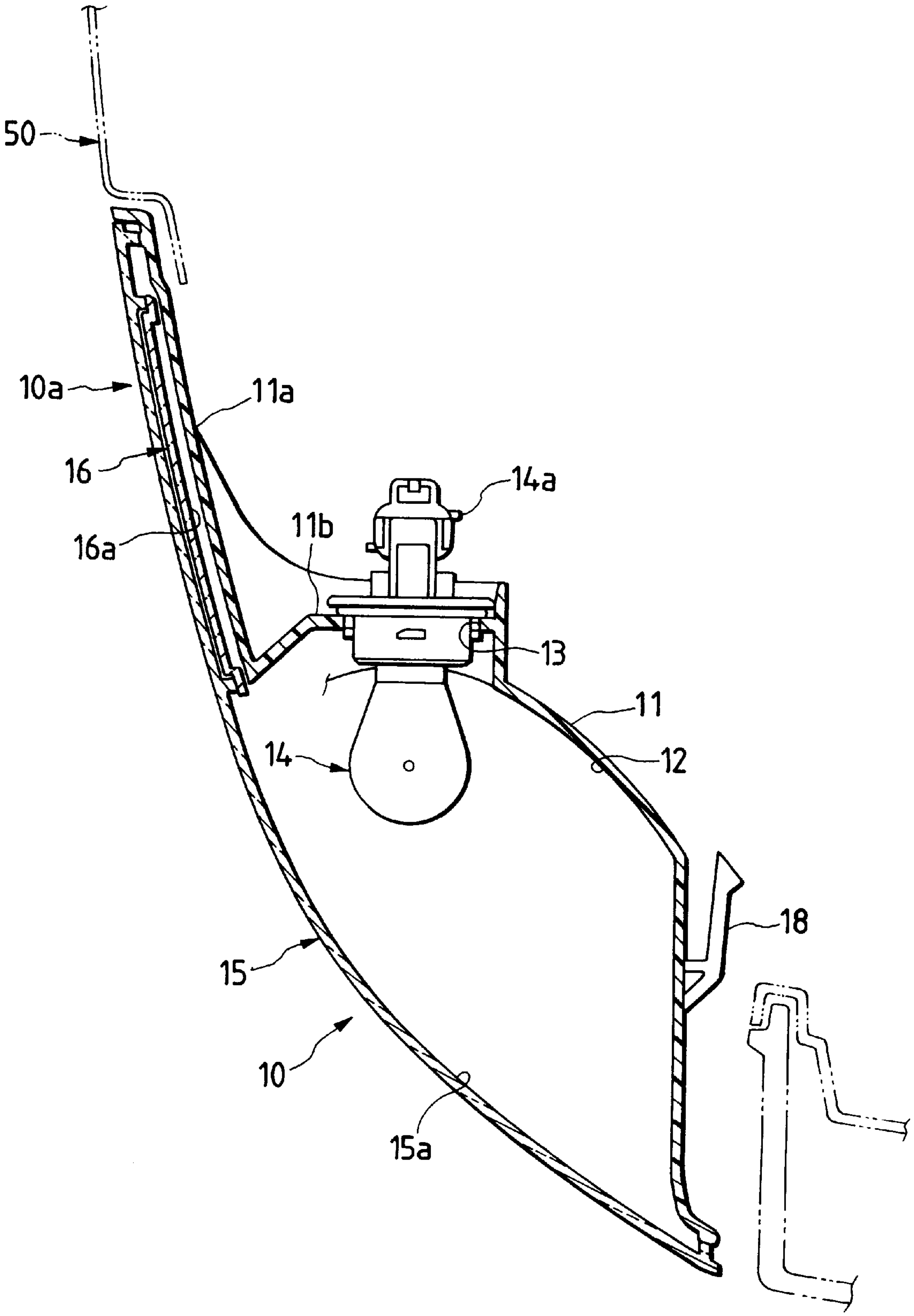
FIG. 4 is a horizontal cross-sectional view of the lamp (taken along the line IV—IV of FIG. 1)
Figure 5:
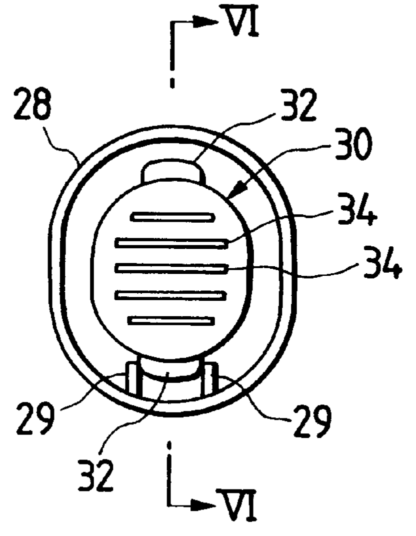
FIG. 5 is an elevational view of the vicinity of an air hole as seen from a rear side of the lamp.
Figure 6:
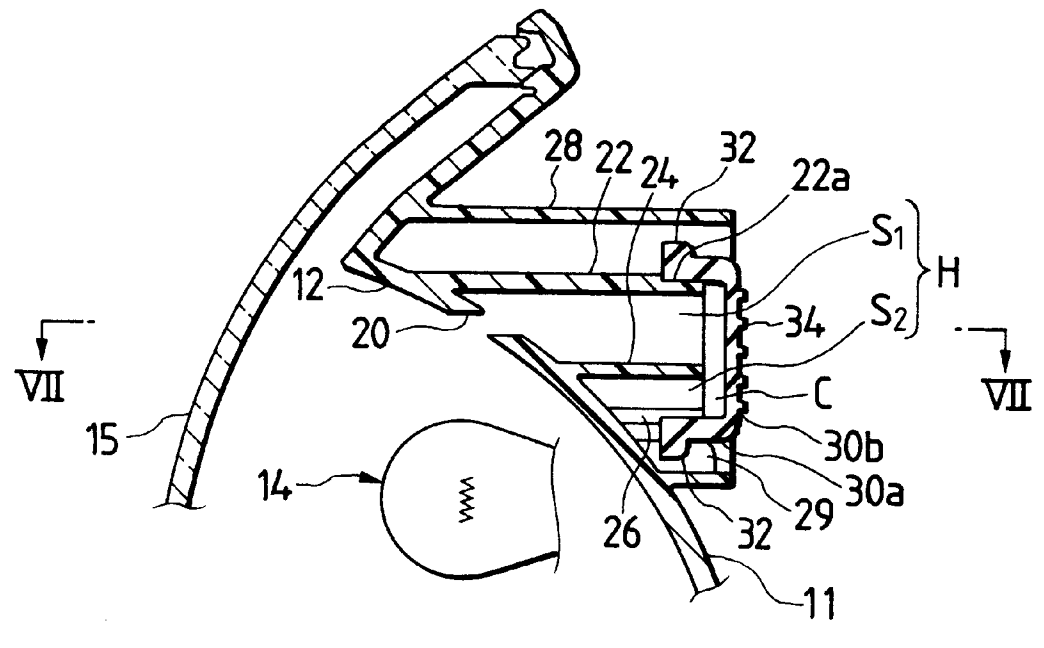
FIG. 6 is a vertical cross-sectional view of the lamp (taken along the line VI—VI of FIGS. 2 and 5) at a position of formation of the air hole.
Figure 7:
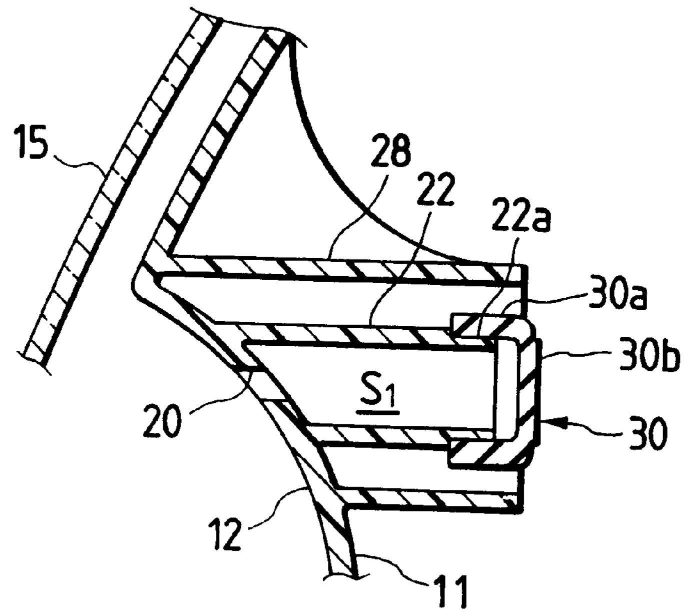
FIG. 7 is a horizontal cross-sectional view of the lamp (taken along the line VII—VII of FIG. 6) at the position of formation of the air hole.
Figure 8:
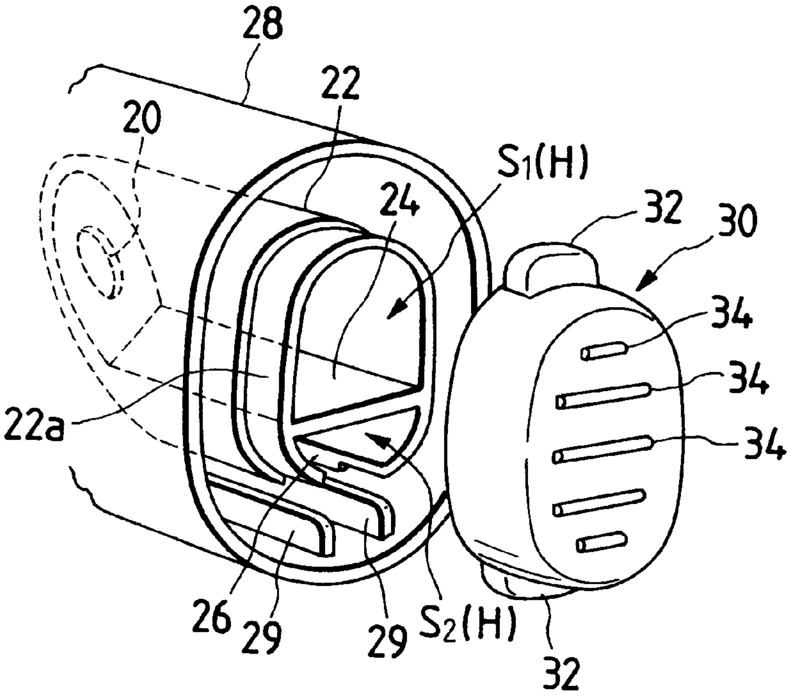
FIG. 8 is a perspective view of a cap and a tubular member as seen from the rear side of the lamp.
Figure 9:
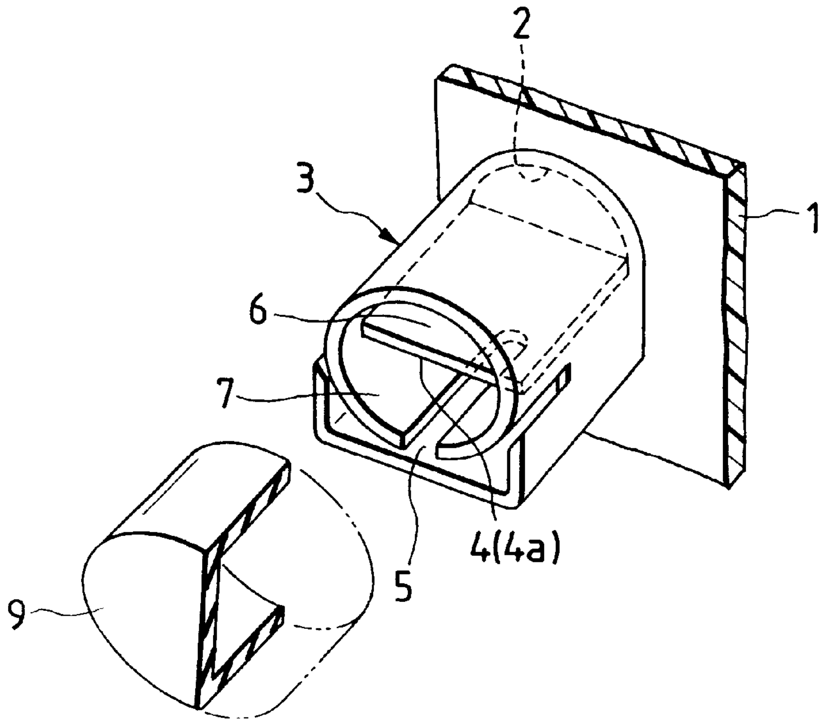
PRIOR ART FIG. 9
FIG. 9 is a perspective view of the vicinity of an air hole in a conventional vehicular lamp.
Figure 10:
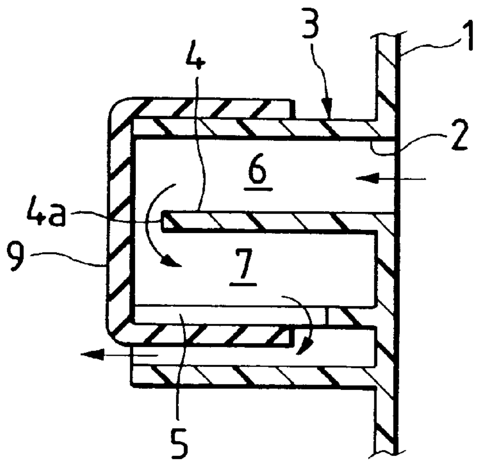
PRIOR ART FIG. 10
FIG. 10 is a vertical cross-sectional view of the conventional vehicular lamp at a position of formation of the air hole.

FIGS. 1 to 8 show one preferred embodiment of the present invention, and FIG. 1 is a front-elevational view of one preferred embodiment of a front turn signal lamp of the present invention, FIG. 2 is a plan view of the lamp, FIG. 3 is a vertical cross-sectional view of the lamp (taken along the line III—III of FIGS. 1 and 2), FIG. 4 is a horizontal cross-sectional view of the lamp (taken along the line IV—IV of FIG. 1), FIG. 5 is an elevational view of the vicinity of an air hole as seen from a rear side of the lamp, FIG. 6 is a vertical cross-sectional view of the lamp (taken along the line VI—VI of FIGS. 2 and 5) at a position of formation of the air hole, FIG. 7 is a horizontal cross-sectional view of the lamp (taken along the line VII—VII of FIG. 6) at the position of formation of the air hole, and FIG. 8 is a perspective view of a cap and a tubular member as seen from the rear side of the lamp.

In these Figures, the turn signal lamp 10 is mounted on a front corner portion of a vehicle body 50, and has an opening open to the front side (lower side in FIG. 4) and one widthwise side (left side in FIG. 4) of the vehicle body 50. The lamp 10 comprises a container-like lamp body 11 of a synthetic resin having a reflector 12 formed integrally on an inner side thereof, a bulb 14 (serving as a light source) fitted in a bulb insertion hole 13 formed through a rear wall of the lamp body 11, and a front lens 15 of a synthetic resin with an amber color which is mounted in a front opening in the lamp body 11, and has a curved surface continuous with an outer surface of the vehicle body 50.

Cylindrical steps (diffusion steps) 15*a* are formed on a reverse surface of the front lens 15, and the light of the bulb 14, which is reflected by the reflector 12, is diffused in right and left directions by the cylindrical steps 15*a*, and is distributed. That portion 11*a* of the lamp body 11, disposed at the widthwise side of the vehicle body, faces the front lens 15 in adjacent relation thereto to form a region of a small depth at a widthwise side portion 10*a* of the lamp, and a reflective surface 16*a* is formed on that portion of the inner surface of the front lens 15 facing this region of a small depth, and a reflex reflector 16 is provided at this portion.

A bracket 17 extends from an upper portion of the lamp body 11, and is adapted to be fixed to the vehicle body by a nut and a bolt. A hook 18 extends from the lamp body 11, and is disposed at a position lower than the bracket 17, and this hook 18 is adapted to be engaged in a retaining hole (not shown) in the vehicle body to be retained therein against withdrawal.

The air hole 20 for effecting a breathing operation is formed in the lamp body 11, and the tubular member 22 is formed on that portion of the lamp body 11 at which the air hole 20 is formed, and the cap 30 of rubber is fitted on a distal end portion of this tubular member 22, so that a labyrinth-like air passage H, communicating with the air hole 20, is formed within the tubular member 22.

Namely, the tubular member 22 of an oval transverse cross-section whose right-left width is smaller than its top-bottom width is formed on and extends rearwardly from the lamp body 11 in generally surrounding relation to the air hole 20. A generally horizontally-extending partition wall 24 is formed within the tubular member 22, and a slit 26 is formed in a lower portion of a peripheral wall of the tubular member 22, and extends from the distal end of the tubular member 22 toward a proximal end thereof.

The cap 30 (made of a synthetic resin or rubber) of an oval transverse cross-section whose right-left width is smaller than its top-bottom width is fitted on the distal end portion of the tubular member 22 in such a manner that a gap C is formed between the cap 30 and the distal end of the tubular member 22 and that part of the slit 26 is not covered with the cap 30. An upper space $S_1$ and a lower space $S_2$ are formed within the tubular member 22, and the upper space $S_1$ communicates with the interior of the lamp body 11 through the air hole 20, and the lower space $S_2$ communicates with the upper space $S_1$ through the gap C between the cap 30 and a front edge of the partition wall, and also communicates with the exterior of the tubular member 22 through the slit 26.

The labyrinth-like air passage H, communicating the air hole 20 with the exterior of the tubular member 22, is formed by the upper space $S_1$ and the lower space $S_2$ formed within the tubular member 20, and with this construction the breathing operation is effected, and also water is less liable to intrude into the lamp body 11 through the labyrinth-like air passage H. A cap-engaging step portion 22*a* is formed on an outer peripheral surface of the distal end portion of the tubular member 20, and the cap 30 is fitted on this step portion 22*a*.

The air hole 20 is disposed generally just above the bulb insertion hole 13 in which the bulb 14 is inserted, and this air hole 20 discharges the warm air from the lamp body 11 therethrough, and also introduces the cool air into the lamp body 11 therethrough, thus efficiently forming an air convection within the lamp body 11, and therefore a heat-radiating effect of the lamp is enhanced, and also the generation of a dew condensation is prevented.

The tubular member 22, as well as the cap 30 fitted on the tubular member 22, has the oval transverse cross-section whose right-left width is smaller than its top-bottom width, and the amount of bulging of the tubular member 22 in the right-left direction is smaller than that in the top-bottom direction, and therefore the tubular member 22 is less liable to interfere with other members.

A waterproof wall 28 extends from the lamp body 11 in surrounding relation to the tubular member 22, and water, splashing from the lower direction along the rear surface of the lamp body 11, and tending to intrude into the tubular member 22 through the slit 26, is, of course, intercepted by the waterproof wall 28, and also water, splashing in various directions along the rear surface of the lamp body 11, is intercepted by the waterproof wall 28, so that the water will not intrude into the air passage H in the tubular member 22.

The tubular member 22 and the waterproof wall 28 are disposed generally just above a bulge portion 11*b* forming the bulb insertion hole 13, and therefore this bulge portion 11*b* serves as a barrier for water splashing upwardly, and therefore the amount of the water, which can reach the tubular member 22 and the waterproof wall 28, is very small, so that the water can not easily intrude into the air passage H in the tubular member 22.

The waterproof wall 28 has an oval transverse cross-section (similar to the oval transverse cross-section of the tubular member 22 and cap 30) whose right-left width is smaller than its top-bottom width, and the amount of bulging of the waterproof wall 28 in the right-left direction is smaller than that in the top-bottom direction, and therefore the waterproof wall 28 is less liable to interfere with other members.

The waterproof wall 28 extends to such an extent that its distal end lies generally flush with a plane in which the outer surface of the head of the cap 30 is disposed, and therefore the operator, when exchanging the bulb, will not accidentally touch the cap 30.

Projections 32 are formed respectively on outer surfaces of opposite longitudinal ends of the cap 30, and a pair of (right and left) vertical ribs 29, which are engageable with the projection 32 of the cap 30, are formed on an inner surface of that portion of the waterproof wall 28 facing the slit 26 in the tubular member 22. The projection 32 of the cap 30 is engaged with the vertical ribs 29 of the waterproof wall 28, so that the cap 30 is positioned relative to the tubular member 22 in the peripheral direction, and also the cap 30 is prevented from rotating in the peripheral direction, and therefore even if vibrations or the like act on the cap 30, the cap 30 will not be disengaged from the tubular member 22.

The two projections 32 and 32, formed on the outer surface of the cap, have the same size, and even if either of the opposite longitudinal ends of the cap 30 is disposed at the upper side, the cap 30 can be fitted on the tubular member 22.

As shown in FIGS. 6 and 7, a side wall 30*a* of the cap 30 is larger in thickness than its head portion 30*b*, and when the cap 30 is to be fitted on the tubular member 22, an open end of the cap 30 will not be much deformed so that the cap 30 can be smoothly fitted on the tubular member 22.

Anti-slip ridges 34 are formed on the head portion of the cap 30, and prevent the finger from slipping relative to the cap 30 when fitting the cap, and therefore the fitting of the cap 30 can be effected positively and rapidly.

The direction of bulging of the bulge portion 11*b* forming the bulb insertion hole 13, as well as the direction of attaching and detaching of the bulb 14, is parallel to the axis of the vehicle, but the direction of extending of the tubular member 22, as well as the direction of extending of the waterproof wall 28, is inclined relative to the direction of bulging of the bulge portion 11*b* and the direction of attaching and detaching of the bulb 14, and the tubular member 22 and the waterproof wall 28 will not obstruct the attachment and detachment of the bulb 14, and a bulb socket 14*a*, projecting rearwardly from the bulge portion 11*b*, will not obstruct the attachment and detachment of the cap 30.

In the above embodiment, although the waterproof wall 28 is provided in surrounding relation to the tubular member 22, the waterproof wall does not always need to surround the tubular member 22, but need only to be provided beneath the slit 26 so as to prevent water from intruding into the slit 26, and if the waterproof wall, having a width smaller than the right-left width of the tubular member 22, extends along the tubular member 22, there is achieved an advantage that the waterproof wall is less liable to interfere with other members.

Although the above embodiment is directed to the turn signal lamp, the invention is not limited to this lamp, but can be applied to a wide variety of vehicular lamps for an automobile which have an air hole formed in a lamp body.

As is clear from the foregoing description, in the vehicular lamp of the invention for the vehicle, the interior of the lamp body communicates with the exterior of the tubular member through the air passage in the tubular member so that the breathing operation can be effected, and since this air passage in the tubular member is formed into a labyrinth-like construction, water will not intrude into the lamp body through this air passage.

The tubular member, which constitutes the labyrinth-like air passage communicating with the air hole in the lamp body, as well as the cap fitted on this tubular member, has the oval transverse cross-section whose right-left width is smaller than its top-bottom width, and therefore the tubular member is less liable to interfere with other members, and the position of formation of the air hole is less limited. Therefore, the air hole can be provided in such predetermined portion of the lamp body that the breathing operation can be performed effectively and that water is less liable to reach the air hole.

The labyrinth construction of the air passage in the tubular member is more complicated, so that the effect of preventing water from intruding into the lamp body is enhanced.

The intrusion of water into the tubular member through the slit is prevented by the waterproof wall provided below and extending along the slit in the tubular member, and therefore water will not intrude into the lamp body.

The cap is positioned relative to the tubular member in the peripheral direction, and also the cap is prevented from being disengaged from the tubular member. Therefore, the cap can be easily fitted on the tubular member, and there is not encountered a disadvantage that the cap will be disengaged from the tubular member because of vibrations or the like.

When fitting the cap on the tubular member, the open end of the cap will not be deformed, and therefore the cap can be smoothly fitted on the tubular member.

When fitting the cap on the tubular member, the tip of the finger will not slip, and therefore the cap can be smoothly fitted on the tubular member.

What is claimed is:

1. A vehicular lamp comprising:

a lamp body having a front opening;

a light source secured to said lamp body;

a lens coupled to said front opening of said lamp body;

an air hole formed in said lamp body; and an air communication device extending rearward from said lamp body for communicating the interior of said lamp body to the exterior thereof through said air hole, said air communication device comprising:

a tubular member surrounding said air hole, said tubular member being of an oval transverse cross-section whose right-left width is smaller than its top-bottom width, said tubular member being formed therewith a slit disposed in a lower portion of a peripheral wall thereof and extending in a direction of an axis of said tubular member;

a partition wall formed within said tubular member; and a cap of an oval transverse cross-section whose right-left width is smaller than its top-bottom width is fitted on a distal end portion of said tubular member in such a manner that part of said slit is not covered with said cap, wherein said partition wall and said cap defines a labyrinth-like air passage within said tubular member.

2. The vehicular lamp according to claim 1, wherein said partition wall extends generally horizontally.

3. The vehicular lamp according to claim 1, further comprising a waterproof wall formed on and extending from said lamp body, and said waterproof wall extends beneath said slit in said tubular member.

4. The vehicular lamp according to claim 3, wherein said waterproof wall comprises a pair of right and left ribs formed on an upper surface thereof, and said cap comprises a projection for engagement with said ribs.

5. The vehicular lamp according to claim 1, wherein a side wall of said cap is larger in thickness than a head portion of said cap.

6. The vehicular lamp according claim 1, wherein said cap comprises anti-slip projections and recesses formed at the head portion thereof.

7. The vehicular lamp according claim 1, wherein said cap is formed of rubber.

8. The vehicular lamp according claim 1, wherein said tubular member comprises a cap-engaging step portion formed on an outer peripheral surface of the distal end portion thereof.

9. The vehicular lamp according claim 1, wherein said air hole is disposed substantially above the light source.

10. The vehicular lamp according to claim 3, wherein said waterproof wall includes a distal end, said distal end defining a first plane, and said cap includes an outer surface, said outer surface defining a second plane, wherein said first plane is substantially flush and substantially coplanar with said second plane.

11. The vehicular lamp according to claim 3, wherein said waterproof wall has an oval transverse cross-section for surrounding the tubular member.

12. A vehicular lamp comprising:

a lamp body having an air communication device, wherein said air communication device includes:

a tubular member, said tubular member being of an oval transverse cross-section, said tubular member having a slit disposed in a lower portion of a peripheral wall thereof and extending in a direction of an axis of said tubular member; and a cap of an oval transverse cross section adapted to be fitted on a distal end portion of said tubular member.

13. The vehicular lamp according to claim 12, wherein:

said distal end defines a first plane; and said cap includes an inner surface, said inner surface defining a second plane, wherein said second plane is substantially coplanar with said first plane.

14. The vehicular lamp according to claim 12, wherein said tubular member includes a partition wall formed therein, wherein said partition wall terminates in a wall end.

15. The vehicular lamp according to claim 14, wherein:

said distal end defines a first plane; and said cap includes an inner surface, where said inner surface defines a second plane, wherein said second plane is substantially coplanar with said first plane.

16. The vehicular lamp according to claim 15, wherein said inner surface is offset a non-zero distance from said wall end.

17. The vehicular lamp according to claim 16, wherein said inner surface is substantially coplanar and substantially flush with said distal end.

18. A vehicular lamp comprising:

a lamp body;

a tubular member having an oval cross-section, said tubular member disposed on said lamp body; and a cap having an oval cross section, wherein said cap is adapted to close a distal end of said tubular member, wherein said cap and said tubular member define a labyrinth-like air passage.

* * * * *